United States Patent [19]

Schudlich et al.

[11] Patent Number: 4,484,897
[45] Date of Patent: Nov. 27, 1984

[54] DEVICE FOR NIPPLING UP ELECTRODES IN AN ELECTRIC FURANCE

[75] Inventors: Kurt Schudlich, Witten-Annen; Günter Vielstich, Witten-Heven; Josef Mühlenbeck; Josef Otto, both of Wetter; Hannsgeorg Bauer, Witten-Bommern; Dieter H. Zöllner; Friedrich Rittmann, both of Nuremberg, all of Fed. Rep. of Germany

[73] Assignee: Arc Technologies Systems, Ltd., Grand Cayman, Cayman Islands

[21] Appl. No.: 367,899

[22] Filed: Apr. 13, 1982

[30] Foreign Application Priority Data

Apr. 16, 1981 [DE] Fed. Rep. of Germany ....... 3115628

[51] Int. Cl.³ .............................................. H01J 9/18
[52] U.S. Cl. ..................................... 445/67; 81/57.15
[58] Field of Search .... 445/67; 81/57.38, 57.15–57.21

[56] References Cited

U.S. PATENT DOCUMENTS

| | | | |
|---|---|---|---|
| 1,802,210 | 4/1931 | Kinser | 81/57.16 |
| 2,322,918 | 6/1943 | Brooke | 81/57.15 |
| 3,550,485 | 12/1970 | Dickman | 81/57.15 |
| 3,935,760 | 2/1976 | Taylor | 81/55 |

Primary Examiner—Kenneth J. Ramsey
Assistant Examiner—Kurt Rowan
Attorney, Agent, or Firm—John J. Freer

[57] ABSTRACT

A device for the mechanical nippling up of electrode sections on an electrode positioned vertically in an electrode holder in an electric furnace, especially an arc furnace, by means of screw nipples forming the connection. The device comprises coaxial cylinders forming a coupling which can be coupled automatically or by control means with a connector element located on the upper end of the electrode section to be nippled up.

13 Claims, 2 Drawing Figures

DEVICE FOR NIPPLING UP ELECTRODES IN AN ELECTRIC FURANCE

FIELD OF THE INVENTION

The invention concerns a means for joining or so-called nippling up of electrode sections to an electrode arranged vertically under torsional force in an electrode holder within an electrode furnace, particularly an electrode furnace, particularly an electric arc furnace.

BACKGROUND OF THE INVENTION

The electrodes concerned are conventional electrodes which consist wholly of material consumed within a furnace environment, such as graphite.

In electric arc furnaces of typical size, each fitted with at least three electrodes of the type concerned, it is generally necessary at least once each operating day to refit at least one electrode for further furnace operation by the mounting of a new active electrode section. This refitting is often performed manually. Where a conventional electrode is being refitted, nippling up of a new active electrode section to the top end of a substantially spent electrode shank is accomplished by employing a lifting appliance such as a shop crane, to move a new electrode section over the electrode shank clamped in an electrode holder upon the arc furnace. The new electrode section is lowered such as by a screw nipple already mounted on lower end of the new section, so that the screw nipple of the new electrode section is inserted into a bore in the top end of the electrode shank being refitted. Then, using clamps, the nippling up of the new electrode section is carried out by manually threading the new section onto the top end of the electrode shank.

Such a nippling up process counts among its disadvantages the operators having to work on the cover of the arc furnace, where they are exposed to great heat, and to carbon monoxide and carbon dioxide gases escaping from the furnace for the duration of the work, generally several minutes. In addition proper joining of the new section to the rest of the electrode shank is dependent on the skills of the operators as to correct connection, with a required initial tension. The initial tension between the newly connected electrode sections has a significant influence on the electrical transfer resistance between the electrode sections, and thus on the functioning and energy consumption of the electrode.

To alleviate such difficulties, several means for nippling up conventional electrodes already have been proposed.

A known device as shown in German Patent OS 16 90 556 comprises two cylinders coaxially arranged one inside the other. The inner cylinder is rotatable by a drive relative to the outer cylinder. The inner cylinder has on its lower end chucks radially pressable onto the lower end of an electrode section to be refitted by being nippled up. The outer cylinder can be supported employing torsional forces in an inserted position against the electrode holder which is fixed on the furnace.

Such a device makes the mechanical nippling up of an electrode section on an electrode clamped in an electrode holder fixed on a furnace possible. Thus there is no need for workers to be upon the cover of a furnace which is in operation which today is scarcely reasonable in the light of modern regulations concerning work conditions.

However such a device described is relatively costly. The device includes two electric motors; one is located above the inner cylinder intended to clamp the electrode section by an axially relative motion between the two cylinders; the second motor is arranged not far from the lower end of the device on the outer cylinder and rotates the inner cylinder via a worm gear for the nippling up process. Such a configuration results not only in a very substantial height for the device, but also in a large diameter adjacent the furnace. The large diameter can be very disadvantageous to operability of the device. When clamping an electrode section, the inner cylinder, designed as a clamping bush is displaced in the direction of its longitudinal axis against a surrounding conical ring, so that the clamping elements, at least at the start of the clamping motion, may mechanically damage the electrode section; this may lead to later crack formation in the electrode section during use in a furnace.

To overcome these disadvantages, the known device has been further developed as shown by German Pat. Publication AS 24 18 688 to provide between the two cylinders a third, coaxially arranged cylinder (intermediate cylinder) which for clamping of an electrode section to be nippled up is displaceable in the direction of its longitudinal axis by a threaded nut rotatable employing a motor driven toothed or chain-drive arranged adjacent the upper portion of the outer cylinder. Rotation of the threaded nut effects the rotation of the intermediate cylinder. To nipple up the electrode section, a detent securing the inner cylinder against rotation during the clamping process is released.

Because of this intermediate cylinder design, such a device has near the furnace an outer diameter only slightly exceeding that of the electrode. In addition, clamping and nippling up is done by a common motor located adjacent the head of the device resulting in a shortening of the height of the device. As before such devices are still relatively large, since the new electrode section being nipped up is clamped at its lower end so that the height is still substantially greater than the length of the new electrode section. A major disadvantage in the case of such device is that three cylinders are provided each having the required length, making the device both costly in materials and correspondingly heavy.

In both these prior devices a common drawback is that the new electrode section is grasped by a chuck causing a complicated design of the overall device and complicating the acceptance of a new electrode section in the nippling up device since the nippling up device has to be exactly axially aligned relative to the electrode section.

A further known nippling up device is shown in German Pat. No. OS 23 38 741. An electrode section to be connected with the electrode is firmly clamped in a holder ring rotatable and vertically adjustable against the electrode holder on the arc furnace. For this purpose a support frame is provided having a support ring guided thereon and an interposed suspension. The support ring carries a drive means and a holder ring suspended on the support ring, the holder ring being equipped with peripherally hydraulically acturated clamping devices for holding the electrode portion in its interior in driven relationship axially with an interposed ring gear secured on the holder ring and rotatable against the support ring, corresponding to the pitch of the nipple connection between the electrode and the electrode section. The suspension is displaceable transversely to the longitudinal axis of the electrode and the support frame is configured as a movable unit having relevant components equipped with guidance parts, by means of which the support frame can be connected in a precisely defined position relative to the electrode holder. After completion of the nipple connection between the electrode and the electrode section mounted thereon, the nippling up device can, after release of the clamping means of the holder ring, be lifted from the electrode holder by a lifting appliance and used elsewhere.

But such a device also has a relatively complicated design caused, on one hand by a costly clamping means and on the other hand by the need for a special support frame for the support ring and a holding ring, whereby the diameter of the device perpendicularly to the axis of the electrode is substantially increased, complicating operability of the device.

All these prior nippling up devices grasp the electrode section by its shell employing a clamping means or the like. Since the electrodes consist of a material such as graphite which is sensitive to certain mechanical stresses, there is a danger that the clamping means may damage the surface of the electrode by formation of furrows, notches or the like. If such a damaged surface of the electrode section engages the electrical contact jaws of the furnace, because of the damage, the electrical transfer efficiency will be reduced resulting in an increased electrical current consumption and/or a certain fall in the performance of the electrode.

DISCLOSURE OF THE INVENTION

The present invention provides a nippling up device having a simple, rugged and reliable design, making possible grasping of a new electrode section to be nipped up quickly, exactly and without manual labor, for example at the storage point for such new electrode sections, to transport the new section to the insertion point on the furnace, and to connect the new section rapidly and reliably on site at the furnace.

The present invention provides a nippling up device having an inner element configured as a coupling for joinder with a connector element located on the upper end of the electrode section to be nippled up.

The inventive nippling up device permits, an automatic and fast grasping and speedy nippling up of a new electrode section on an electrode employing a simple, rugged and reliable design. The nippling up device is movable by a conventional lifting appliance such as a shop crane.

The nippling up device of the present invention is moved by a lifting appliance to a position over the new electrode section to be nippled up, and then lowered onto this electrode section. The inner element configured as a coupling is automatically coupled with the connector element on the top end of the electrode section to be nippled up. The nippling up device is now moved, together with the electrode section, to a position over the electrode shank to be refitted on the furnace and is lowered. The screw nipple for the connection of the lower end of the electrode section with the electrode shank generally is screwed into the lower end of the new electrode shank.

To clean the box or bore on the top end of the electrode shank, the nippling up device may be fitted with a pneumatic cleaning means for injecting compressed air into the box or bore of the electrode shank to remove impurities so that the thread of the screw nipple and the box of the electrode shank can connect easily and precisely. For the nippling up process, an outer element of the inventive nippling up device is coupled using torsional forces to the electrode holder of the relevant electrode shank. For the screwing process, the inner element is rotated relative to the outer element by a drive in an appropriate direction and simultaneously the whole nippling up device is lowered by the crane. The lowering motion can be program controlled.

After connecting the new electrode section with the electrode shank, the inner element configured as a coupling is automatically released from the electrode section to be nippled up, so that the nippling up device can be again raised, removed from the furnace and can be guided to the next operation.

The inventive nippling up device is distinguished by simple and weight-aving design. The axial lengths of both the outer and the inner elements can be kept relatively short. The outer element only has to be provided with corresponding means, e.g. rods or the like, to be able to connect it employing torsional force to the holder of the respective electrode on the furnace. The inner element, configured as a coupling, is connected with the upper end of the electrode section. Therefore, the device of the instant invention may be substantially shorter than the length of the electrode sections.

Due to the design of the inner element as a coupling, the inventive nippling up device works quickly and reliably. Moreover this coupling design contributes to a simple design of the total nippling up device.

A further advantage of the inventive nippling up device is that its use requires no great reequipment measures both for nippling up conventional electrodes as well as for use with so-called combination electrodes which consist of a permanent usable upper section, that is a cooled metal shaft, on the lower end to which active electrode sections, generally of graphite, are affixed. The upper permanent section of the combination electrode can be supplied with a corresponding connection element. To nipple up electrode sections on conventional electrodes it is only necessary to equip the new electrode section with a proper connector element such as a typical screw nipple, the diameter and thread of which corresponds to screw nipples used to connect the electrode sections.

The inventive nippling up device is lastly also suitable for the adjustment of the electrodes during operation of the furnace, permitting conventional adjustment devices to be omitted.

As the inventive nippling up device grasps the electrode section at a special connector element, damage to the electrically conductive material is avoided on the electrode section so that the electrode always maintains electrical efficiency.

In one advantageous embodiment, the inner element serving as the coupling includes a controllable locking means for detachably emgaging a connector element on an electrode section and an insertion means for guiding the movement of connector element of an electrode section to said locking means. The outer element typically includes a suspension device movable relative to the locking means in an insertion direction for the absorption of shocks. This suspension device is used to suspend the nippling up device from a lifting appliance. Accordingly the coupling of the inventive nippling up device has a controllable locking means whereby the control thereof can be either automatic or performed manually such as by the driver of the lifting appliance.

In order to avoid any manual labor when connecting the connector element with the nippling up device, the coupling of the inventive nippling up device has further an insertion means by which the connector element of the electrode section can be guidingly forced into the area of the locking means. The driver of the lifting appliance needs only lower the nippling up device approximately into the area or the connector element of an electrode section, whereupon the coupling and/or its locking means is centered automatically on further lowering of the coupling relative to the connector element, so that the locking means of the coupling securely engages with the connector element of the electrode section.

Since the material of the relevant electrodes, generally graphite, is highly sensitive to shocks and the like, care is required in coupling so that during the coupling process, damage to the electrode or its connector parts is avoided. Hence the inventive nippling up device includes a suspension means movable relative to the locking means in a direction of insertion of the connector to provide shock absoption. Where the nippling up device impacts on the electrode section and where the electrode section is being raised or lowered, inadmissible shocks are absorbed, avoiding damage to the electrode and to the other components.

In a further preferred embodiment the locking means is pneumatically or hydraulically controlled either automatically, or remotely by an operator such as by the driver of a lifting appliance, during the mounting of the nippling up device on the electrode section or when detaching the device from the electrode section, because of this process.

In an especially simple design, the actual locking means is a locking bolt movable perpendicularly to the direction of insertion of the connector means from an open position into a locked position and vice versa. This locking bolt is expediently movable by a pneumatic or hydraulic actuating cylinder.

To protect this actuating cylinder from rough operations encounted in steel manufacture, an to ensure its reliable functioning, the actuating cylinder is located within the inner element positioned vertically above the locking bolt and parallel thereto. A piston rod of the actuating cylinder and the locking bolt are interconnected at their respective ends via a transverse parallel to the insertion direction. In a preferred embodiment of the inventive nippling up device, the coupling can be controlled by the respective operating process itself. That is, the actuating cylinder can be actuated via a control means so that when the nippling up device is placed on the connector element of an electrode section, the locking bolt is moved from the open position into the locked position, and when a tensile force acts on the nippling up device, the locking bolt is retained in the locked position. When the tensile force is absent, or when a certain minimum value of the tensile force is not achieved, the locking bolt is moved from the locked position into the open position.

In such an embodiment the control device, when mounting the nippling up device upon the connector element of an electrode section, can receive a control pulse causing the lock bolt to move from the open position into the closed position employing the actuating cylinder, The control pulse may be sensed in any suitable or conventional manner such as by a mechanical sensor activated when the connector element of the electrode section is wholly inserted in the insertion means. In this inserted position the locking bolt of the coupling enters a corresponding opening arranged on the connector element of the electrode section.

As long as the respective section is suspended from the lifting appliance over the nippling up device for safety reasons care must be taken to ensure that the locking means is not unintentionally released A safety interlock can be achieved in that when a tensile force acts on the coupling the locking bolt of the coupling is detained in the locked position. Such a detent is to be understood as meaning that even if the device is actuated which serves to move the locking bolt from the locked position into the open position by means of the actuating cylinder, opeing will be defeated while a tensile force acts upon the coupling, i.e. the electrode is hanging without other support from the hook of the lifting means.

On the other hand, however, when the electrode section is lowered to the floor, or after connection with an electrode in the furnace, the coupling of the inventive nippling up device should be detachable by hydraulic or pneumatic actuation preferably without the approach of an operator to the device. This object too can be attained by the use of tensile force, in that only when this tensile force is absent or when a certain minimal value thereof is not achieved is the locking bolt moved from the locked position into the open position. The tensile force acting on the nippling up device can be measured in any suitable or conventional way and be used to initate relevant control commands for the locking means.

In a preferred embodiment, the suspension means comprises a suspension bracket movably supported on the outer element of the nippling up device by a spring, which counteracts the tensile force arising on insertion. The control means can interact with the spring of the suspension bracket to actuate the cylinder. Thus in this case the control means scans the state of the spring in order to detect a tensile force acting on the nippling up device and depending thereon generates a control command for the locking means.

The design of the suspension device employing a resilient suspension bracket also provides a simple type of construction which nevertheless ensures the effective absorption of shock forces occurring during the coupling process or during the raising or lowering of an electrode section by the lifting appliance.

An especially simple design of the guiding means for the connector element of an electrode section in the coupling comprises forming the insertion means from a tapering wall element of the inner element which narrows in a direction of insertion of the connector element of an electrode section into the coupling. This tapering, narrowing wall element can be integrally with the inner element. On the inner end of this conical wall element a bearing for the actuating cylinder of the locking menas can be attached.

It is further expedient that on the outer element a motor, preferably hydraulically actuated, is arranged having a pinion engaging a ring gear upon the inner element. Thereby a simple drive means for the rotation of the inner element relative to the outer element is provided.

According to a further preferred embodiment the axis of a pinion associated with the drive can be extended perpendicular to the axis of the elements and the ring gear can be located on the bottom face of the inner element. This measure provides a minimal diameter for the total arragnement.

In order to connect an electrode section exactly and with the right initial tension to a relevant electrode, it is advisable to provide in the transmission between the motor and the inner element a means for the limitation of torque. This means for torque limitation can be configured in any of the known ways.

Pneumatic or hydraulic leads of the component groups of the inner element can be guided via a swivel joint arranged on the inner component. This swivel joint can also be of any of the known types.

To facilitate rotation of the electrode section coupled on the nippling up device by hand relative to the nippling up device, it is advantageous that the connector element should be rotatably connected with the electrode section around its axis. An operable stop for limitation of the rotation of the connector element relative to the electrode section is provided.

To join the connector element with the electrode section concerned, it is advisable that the connection should be made by a screw nipple, the diameter and thread of which correspond to those of the screw nipple interconnecting the electrode sections.

Further advantages and details of the invention will become apparent from the specification of an exemplary embodiment of the inventive nippling up device and the drawings.

BEST EMBODIMENT OF THE INVENTION

Figure 1:
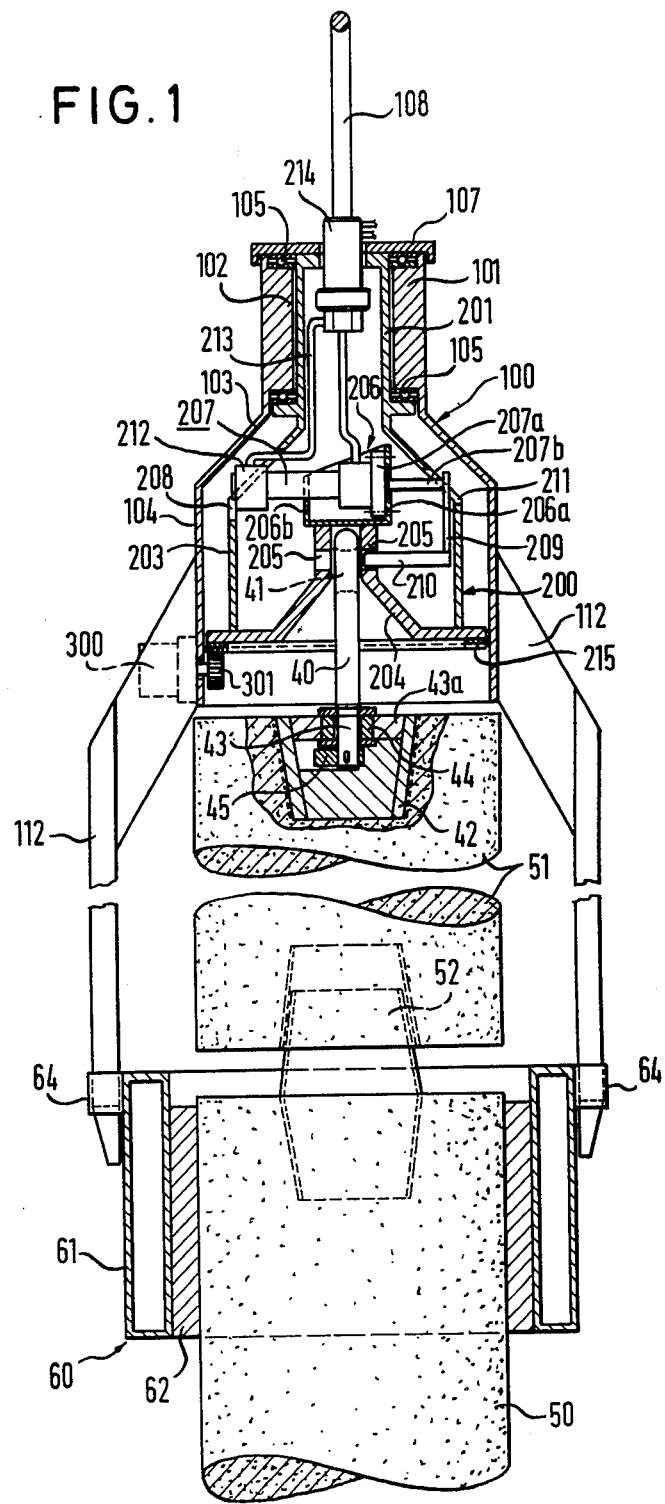
FIG. 1 is an axial section of a nippling up device.

Referring to the drawings, the nippling up device comprises basically an outer substantially hollow cylindrical element which is marked as a whole with 100, and an inner equally substantially hollow cylindrical element marked as a whole with 200 and mounted coaxially in the outer element 100.

The outer element 100 comprises a bearing housing 101 with a bearing 101 with a bearing bore 102, a conical section 103 and an equally adjoining cylindrical section 104.

Comparably the inner element is composed of a cylindrical bearing sleeve 201, an adjoining conical section 202 and an equally adjoining cylindrical section 203.

The cylindrical bearing sleeve 201 of the inner element 200 is mounted in the bearing bore 102 of the outer element 100 rotatably in that two axial bearings 105 and a stopplate 107 are provided, whereby substantially axial forces can be transferred by the bearing arrangement described.

The inner element 200 is designed as a coupling. Hence in the interior of the cylindrical section 203 is an insertion means 204 which narrows conically upwards. In its wall elements two coaxial locking bores 205 are provided perpendicular to the common axis of the two elements 100,200. On the top inner end of the wall element of insertion means 204, there is a bearing casing 206, in which an actuating cylinder marked 207 of the pneumatic or hydraulic type is mounted. A flange 207a of the actuating cylinder 207 is screwed to a wall 206a, parallel to the common axis of the elements 100, 200, of the bearing casing, while an additional support for the actuating cylinder 207 is provided on the wall 206b which is parallel to wall 206a. To enable to insert the actuating cylinder easily in the inner element 200, the latter has a first assembly aperture 208. The piston rod 207b of the actuating cylinder 207 is linked via a traverse 209 parallel with the common axis of elements 100,200 by means of a locking bolt, the axis of which is perpendicular to the common axis of elements 100,200 and is coaxial with the axes of locking bores 205, so that the locking bolt 210 can be pushed into the locking bores 205 and in this position is held by the locking bores 205. To simplify assembly of this arrangement, the relevant wall section of the inner element 200 is fitted with a second assembly aperture.

To actuate the actuating cylinder 207, i.e., to move the piston reciprocally and thereby the piston rod 207b and thereby the locking bolt 210, the actuating cylinder is connected in the usual wal with a suitable control means, such as a valve 212. The valve 211 is in turn connected with a swivel joint 214 employing a lead 213, while said joint 214 is linked to a hydraulic or pneumatic source. The hydraulic swivel joint 214 thus permits the lead connection between a fixed source and the leads of the rotatable inner element 200.

To facilitate rotating the inner element 200 relative to the outer element 100 about the common axis, a hydraulic motor 300 is provided on the outer element 100 and linked by corresponding leads and the hydraulic swivel joint 214 to the source. On the axis of the motor 300, perpendicular to the common axes of the elements 100, 200, there is a pinion 301, which engages a ring gear 215 arranged on the bottom face of the inner element 200.

To be able to suspend the nippling up device from the hook of a lifting appliance, such a shop crane, a U-shaped suspension bracket is provided via a pressure spring 109 on a support plate 110, and connected with the outer element 100. Thus ths suspension bracket 108 is movable in the direction of the co-axis of elements 100,200., i.e. in the insertion direction, relative to the elements 100,200 and the tensile force acting on the nippling up device is absorbed by the pressure spring 109.

To measure the tensile force accepted by pressure spring 109, during insertion of the nippling up device, this pressure spring 109 is connected to a measuring and control means 111 (shown only schematically), so that, depending on the tensile force, the coupling can be correspondingly controlled via the control means 212 of the actuating cylinder 207.

On the outside of the outer element 100, supports 112 extend axially downwardly, by means of which the nippling up device can be coupled with the electrode holder of an electrode of an electric furnace.

Figure 2:
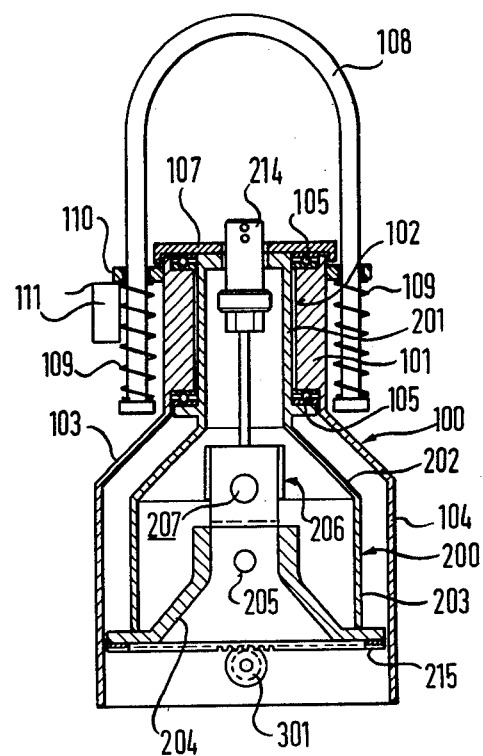
FIG. 2 is an axial section rotated by 90° relative to FIG. 1, of a nippling device engaging an electrode section.

Referring to FIG. 2, for interaction of the coupling described with the nippling up device, the latter includes a connector element 40 on its top end, configured to be shackle-like and having an opening 41 accepting the locking bolt 210 of the nippling up device. This connector element 40 is linked rotatably with a conical screw nipple having an external thread 42. The connector element 40 merges into a bolt 43, inserted in a bearing sleeve 44, located centrally in a facing plate 43a of the screw nipple 42.

To transfer the tensile forces between the connector element 40 and screw nipple 42 there is a safety bolt 45, which simultaneously provides a torque limitation, so that after a degree of rotation, a torque moment can be transferred between the connector element 40 and the screw nipple 42. The screw nipple 42 is screwed into a conical box or bore with internal thread at the top end of the electrode section 51.

Of the electric furnace itself only the electrode holder marked as a whole with 60 is shown which consists of the actual electrode holder 61 and the contact jaws 62. The electrode holder 60 clamps an electrode 50 onto which the electrode section 51 is to be nippled up in the manner described below. For this purpose in the drawing the top end of the electrode 50 is provided with a screw nipple 52 of the usual type.

The nippled up device is used as follows:

It is suspended by a suspension bracket 108 on the hook of a lifting appliance. In this way the nippling up device can be raised, lowered and driven.

To grasp a new electrode section the nippling up device is lowered onto an electrode section 51 so that the connector element 40 of the electrode section slides into the tapered insertion means 204, for which purpose the locking bolt 210 is in the open position shown in FIG. 2. As soon as the aperture 41 of the connector element 40 of the electrode section 51 is flush with the two locking bores 205 of the nippling up device, the locking bolt 210 is thrust into the two locking bores 205 and into the aperture 41 of the connector element 40, for which purpose the piston of the actuating cylinder 207 is correspondingly displaced. The necessary switching on of actuating cylinder 207 can either be done by a sensor actuated on insertion of the connector element 40 of the electrode section 51 into the conical insertion means 204 of thge nippling up device or it can be remotely controlled, for example, by the driver of the lifting appliance.

In this way the electrode section 51 to be nippled up is coupled with the nippling up device. As long as electrode section 51 is handing on the nippling up device and this in turn is handing on the hook of the lifting appliance, a corresponding tensile force acts on the spring 109 and the measuring and control means 111 prevents any unintentional release of the coupling of the nippling up device by displacement of the locking bolt 210 from the locked position into the open position.

If, however, the electrode section 51 is either lowered to the floor or finally connected with the electrode 50, whereupon the hook of the lifting appliance is lowered so that thus the tensile force acting on spring 109 does not attain a minimal value, the coupling can be released again from the electrode section. The corresponding control of the actuating cylinder 207 can also be performed either, for example by the operator of the lifting appliance by remote control or can be brought about in dependence upon tensile force via a pulse generated by the measuring and control means 111.

The nippling up device with the held electrode section 51 is guided for the nippling up of this electrode section onto the top end of a spend electrode over the furnace so that the joint axis of the nippling up device and of electrode section 51 is co-axial with the axis of the electrode 50 arranged in the furnace. Then the nippling up device is lowered until the supports 112 engage in pockets 64 of the electrode holder 60, so that the outer element 100 of the nippling up device is coupled with torsional strength with the electrode holder 60. This lowering continues until the screw nipple 52 of the arc furnace electrode 50 engages the box on the lower end of the electrode section 51 to be nippled up. The screwing of an electrode section 51 onto the screw nipple 52 of the electrode 50 is done by a corresponding rotation of the inner element 200. This rotation is created by corresponding control of the motor 300. For the duration of the screwing motion, the lifting appliance is lowered corresponding to the pitch of the screw nipple by an appropriate automatic control.

In order to connect the electrode section 51 with the electrode 50 exactly at the right inital tension, the transmission between motor 300 and the inner element 200 has a means for torque limitation which can be designed in any of the known ways and therefore is neither shown nor more precisely described.

To control the locking means of the nippling up device and the hydraulic motor 300 from one source, a three-way valve is provided via which either the motor 300 or the locking means and/or its actuating cylinder 207 are controlled. This three-way valve can be configured so that after a slight raising of the nippling up device by the lifting appliance control is automatically switched from motor 300 to actuating cylinder 207 so that it moves the locking bolt 210 into its closed position.

After the end of the nippling up process, the locking means of the nippling up device is released by a coresponding pulse at the actuating cylinder 207, so that the nippling up device can be raised and guided to the next cycle.

By means of the nippling up device, it is also possible to effect a resetting of the electrode shank. The connector element 40 of the top electrode section is coupled with the nippling up device, the electrode holder of the furnace is released, the electrode shank is lowered by the lifting appliance and then the electrode holder is closed again and the nippling up device is decoupled.

While a preferred embodiment of the invention has been shown and described in detail, it should be apparent that various modifications may be made thereto without departing from the scope of the claims that follow.

We claim:

1. A device for nippling up electrode sections on an electrode located vertically within an electrode holder within an arc electric furnace, screw nipples connecting the electrode sections, comprising: an outer, essentially hollow cylindrical element, and an inner, coaxial, equally essentially hollow cylindrical element within the outer element, a drive means for rotating the inner element relative to said outer element, a coupling including a controllable lock for detachably engaging a connector element affixed to an electrode section, and an insertion means to guide the connector element to the lock; the inner element being configured for connection with the electrode section to be nippled in a torsional force transmitting relationship with the inner element, the outer element being configured for coaxially aligned coupling with the electrode to which the electrode section is to be connected, the outer element engaging at least one of the electrode holder and the arc electric furnace to provide torsional stability for the device relative to the furnace, the outer element having a suspension means movable in a direction of insertion of the connector into the lock for shock absorbingly suspending the device on a lifting appliance, the coupling being integrally contained within the inner element.

2. A device according to claim 1, the lock comprising a locking bolt movable perpendicularly to the insertion direction between an open position and a locked position.

3. A device according to claim 2, the lock being controllable employing a fluid under pressure.

4. A device according to claim 2, the locking bolt being actuated by a fluid under pressure.

5. A device according to claim 4, the actuating cylinder being located within the inner element vertically above the locking bolt and acting along an axis parallel thereto.

6. A device according to claim 5, a piston rod of the actuating cylinder and the locking bolt being connected at their ends via a tranverse parallel to the insertion direction.

7. A device according to any one of claims 4–6, the actuating cylinder being operable by a control means configured so that when the coupling is placed on the connector element of an electrode section, the locking bolt is moved from an open position to a locked position; when a tensile force acts on the nippling up device, the locking bolt is held in the locked position; and when a certain minimum value of the tensile is not attained, the locking bolt is moveable from the locked position to the open position.

8. A device according to claim 7, the control means for the actuating cylinder cooperating with a spring of a suspension bracket of the suspension means.

9. A device according to any one of claims 4–7, the outer element including a motor positioned including a pinion to engage a ring gear positioned upon the inner element.

10. A device according to claim 9, an axis of the pinion extending perpendicularly to the axis of the inner and outer elements, the ring gear being located on a bottom face of the inner element.

11. A device according to claim 9 including a means for the limitation of torque transferred between the motor and the ring gear.

12. A device according to any one of claims 4–6, the insertion means being formed by a tapering wall element of the inner element which narrows in the insertion direction of the connector element of an electrode section into the coupling.

13. A device according to any one of claims 4–6, the suspension means comprising a suspension bracket movably supported on the outer element by a spring configured to counteract tensile forces arising on insertion.

* * * * *